United States Patent [19]

Nguyen et al.

[11] Patent Number: 4,761,884
[45] Date of Patent: Aug. 9, 1988

[54] DEVICE FOR TRIMMING TO A NET SHAPE THE EDGE OF A METAL SKIN

[75] Inventors: Peter D. Nguyen, San Diego; Robert R. Ferenc, La Jolla, both of Calif.

[73] Assignee: General Dynamics Corporation/Convair Division, San Diego, Calif.

[21] Appl. No.: 921,026

[22] Filed: Oct. 20, 1986

[51] Int. Cl.$^4$ ............... B23B 19/14; B23D 47/02; B23D 51/02; B27B 9/04
[52] U.S. Cl. ........................ 30/373; 30/374; 30/375; 30/377; 30/388; 30/286; 30/289; 30/294
[58] Field of Search ............... 30/388, 391, 377, 373, 30/374, 375, 286, 287, 289, 290, 293; 83/825, 829

[56] References Cited

U.S. PATENT DOCUMENTS

| | | | |
|---|---|---|---|
| 2,294,497 | 9/1942 | Zawistowski | 30/273 |
| 3,262,471 | 7/1966 | McCarty | 30/391 |
| 3,332,148 | 7/1967 | Aulerich et al. | 30/286 |
| 3,991,643 | 11/1976 | Girardin | 83/829 |
| 4,648,181 | 3/1987 | Fortin | 30/287 |

Primary Examiner—E. R. Kazenske
Assistant Examiner—Scott A. Smith
Attorney, Agent, or Firm—John R. Duncan; Frank D. Gilliam

[57] ABSTRACT

A metal skin trimming device which cuts an edge of a first metal skin to a net shape that is complementary to the edge of a second metal skin that has been previously attached to a frame, such as the airframe of an aircraft fuselage. A guide carried by the device is adjustable to set the gap that will appear between the edges of the first and second metal skins when they are attached as by riveting to the airframe.

10 Claims, 3 Drawing Sheets

DEVICE FOR TRIMMING TO A NET SHAPE THE EDGE OF A METAL SKIN

BACKGROUND OF THE INVENTION

This invention relates to improvements in devices for manufacturing metal skins, and more particularly, but not by way of limitation, to a device for trimming to a desired net shape a metal skin particularly adapted for use in aircraft.

In the general art of metal fabrication it is desirable to quickly and accurately cut metal to desired shapes for further assembly into a particular component or sub-element. In the field of aircraft manufacture this is especially true since the materials are expensive, the labor to manufacture aircraft costly, and the need for extreme accuracy in the manufacture of detail parts and further assembly is especially acute. In the manufacture of aircraft it is especially important that extreme accuracy be maintained throughout the manufacture of the aircraft. For example, in the manufacture and assembly of the outer metal skins of an aircraft it is extremely desirable to maintain as closely fitting joints between the portions of skins as possible. One reason for this is that gaps between skins in addition be being unsightly and undesirable to a purchaser of the aircraft will cause a roughness in the outer surface of the aircraft and thereby give rise to laminar flow separation. When this occurs and in effect the lamina of air closest to the skin of the aircraft tumbles along the surface, the drag and in turn the specific fuel consumption of the aircraft is increased.

In addition, gaps can also cause undesirable leakage, differentials of thermal expansion and other undesired effects. Generally, manufacturing workers attempt to cut one skin to abut against another to a predetermined extend whereby a undue or varying gap is avoided and a desired gap is achieved in order to accommodate thermal expansion of the aircraft during anticipated operating conditions.

Workers generally assemble one metal skin to the frame of the aircraft fuselage with an edge being cut to a predetermined trueness or net shape prior to attaching the skin to the frame such as by riveting. The adjacent metal skin is then partially attached as by riveting to the frame with a portion permitted to overlap the edge of the previously attached skin. The overlapping portion of metal skin is then scribed or a guiding track provided for cutting the overlapping to a shape that can then be accommodated to the previously attached skin. While these methods have been commonly used in the past, they have been time consuming since great care must be used to avoiding cutting an inaccurate edge on the overlapping skin and thereby necessitate a costly repair to the fuselage of the aircraft.

A need has existed, that has not been satisfied until the present invention, for a hand operated device that may be utilized to quickly and accurately cut to a net shape a metal skin that is in the process of being attached to the frame of an aircraft being manufactured.

BRIEF DESCRIPTION OF THE INVENTION

Briefly stated, the invention contemplates a device for trimming the edge of a metal skin to a net shape that is spaced a predetermined distance from the net edge or true edge of a complementary metal skin that has been previously attached to the frame of an aircraft. The device includes a base plate provided with a slot and a power driven metal saw means that is rotatably attached to the base plate and adapted to extend a rotating metal saw blade through the slot. A lower plate is attached to the base plate at an end of the base plate opposing the slot and extends under the base plate toward the end holding the saw means. The lower plate is provided with a slot which is complementarily sized with respect to the slot in base plate so that the rotating saw blade may be extended through both slots. The lower plate is also provided with a guide means at its outer edge that is adapted to engage the true or net edge of the previously attached skin and as the device is caused to traverse the length of the net edge, while the guide means is maintained in guiding contact with the net edge, the saw blade is caused to engage the overlapping adjacent metal skin and to cut it to an edge that is also net and complementary to the net edge of the attached skin. The guide means is adjustable in order to provide a predetermined gap between the ends of the metal skins.

Other advantages and features of the present invention will become clear from the following detailed description of the preferred embodiment of the invention when read in conjunction with the drawings and appended claims.

DETAILED DESCRIPTION OF THE DRAWINGS

Figure 1:
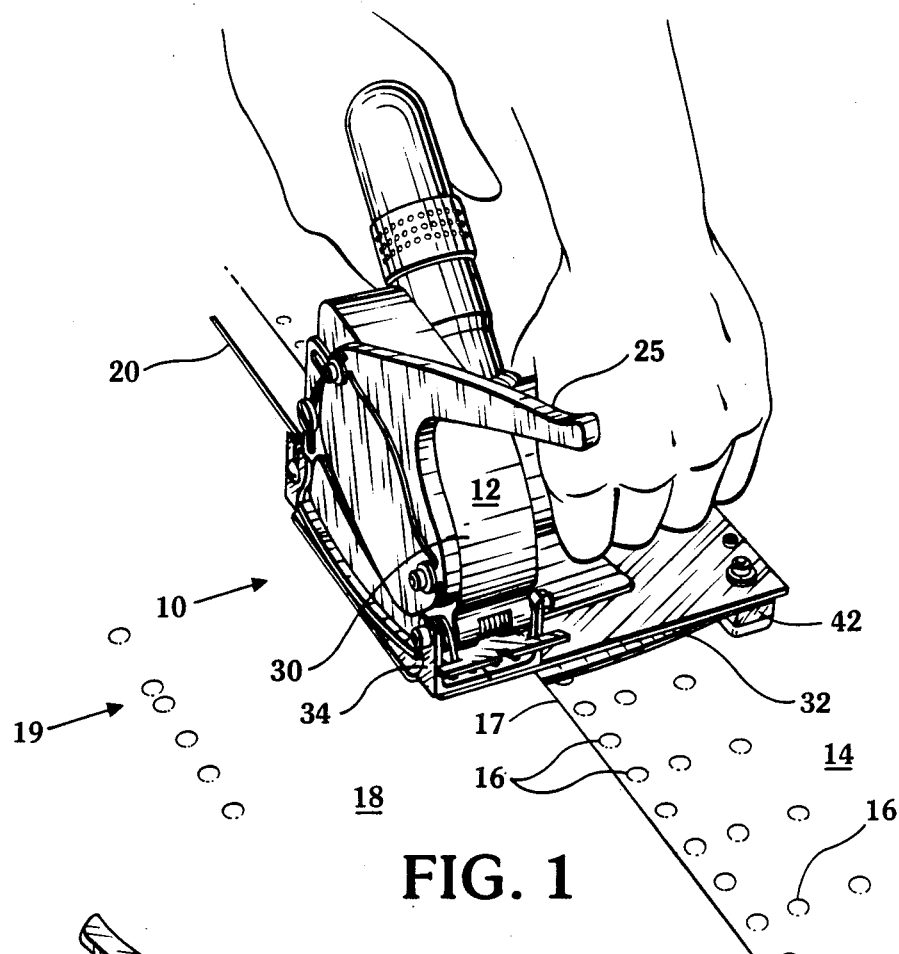
FIG. 1 is a perspective illustrating a device embodying the present invention cutting an edge of a metal skin to be attached to an aircraft frame so that it is complementary to an edge of another metal skin already attached to the frame.
Figure 2:
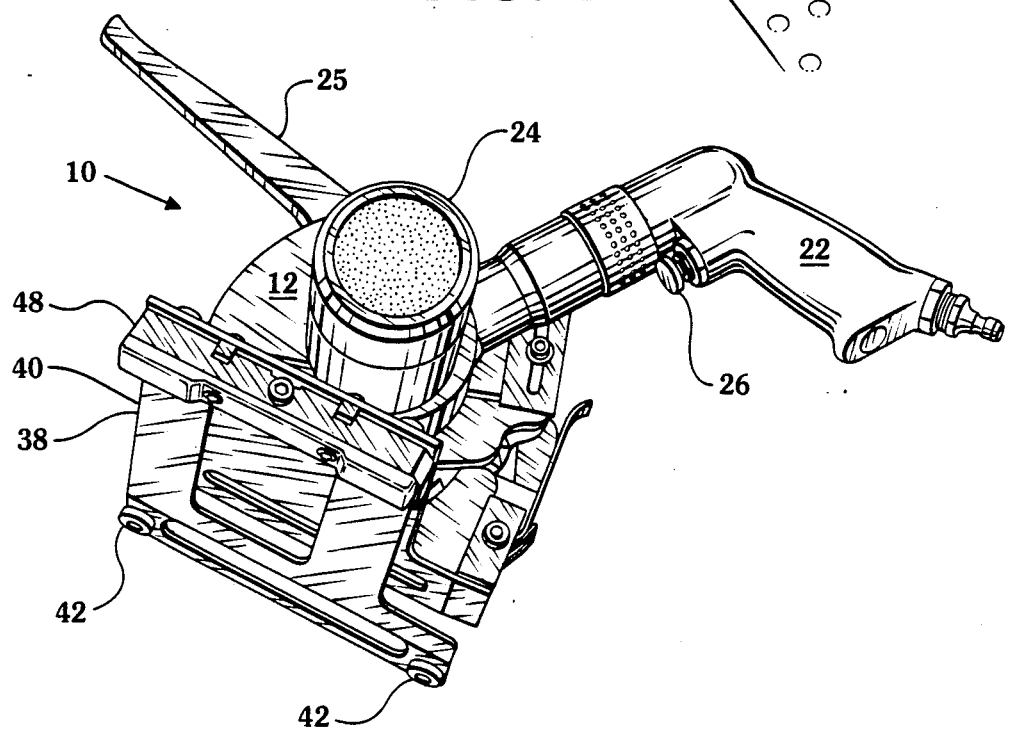
FIG. 2 is another perspective of the device shown in FIG. 1.

Referring now to the drawings in general and to FIGS. 1 and 2 in particular, reference character 10 generally designates a net skin trimming device constructed in accordance with the present invention. The device 10 includes a power driven saw means 12 that is adapted to cut metal skins of the type commonly employed in the construction of aircraft. As seen in FIG. 1, the tool 10 is adapted to be hand held in position on the upper surface of a first metal skin 14 that has been attached to an aircraft frame preferably by rivets 16. The first metal skin 14 has been cut with a predetermined true edge prior to attachment of the first skin 14 to the frame.

A second skin 18 is preliminarily also attached to the airframe by rivets 19 with a portion arranged to overlap the true edge of the skin 14. The device 10 is then employed by an operator to cut the edge 20 of the second skin 18 so that it is spaced a predetermined distance from the edge of the first skin 14. After the edge 20 has been cut to a net shape, the skin 18 is then finally riveted to the airframe.

The saw means 12 is driven by an appropriate power source, such as compressed air, and is provided with suitable hand grips 22, 24 and 25 and an off/on switch 26 that is manually controlled by an operator. The saw 12 further includes a rotatable metal cutting blade 28, seen in FIG. 3, that is protected by housing 30.

Figure 3:
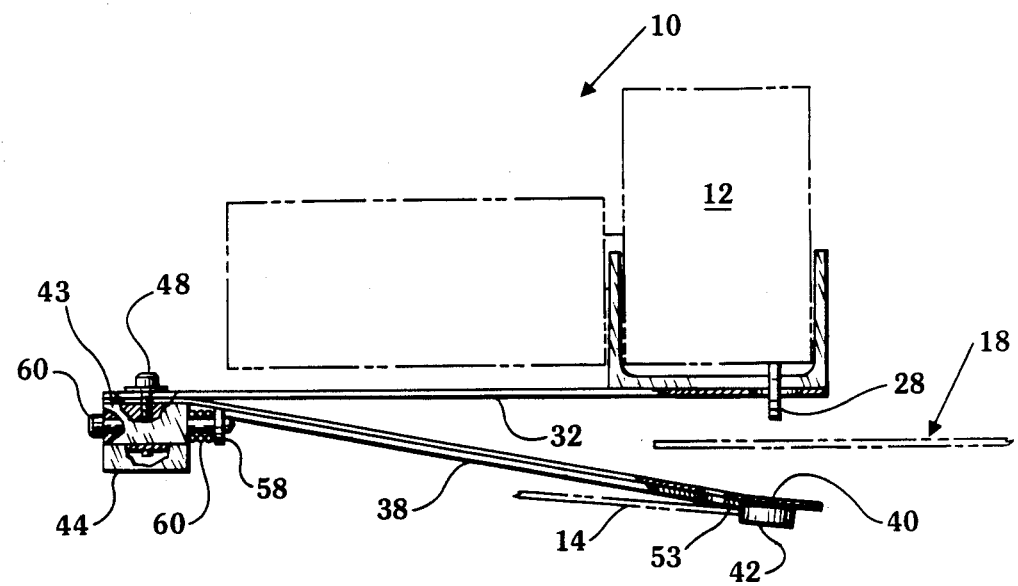
FIG. 3 is a diagrammatic cross section of the device shown in FIGS. 1 and 2.
Figure 4:
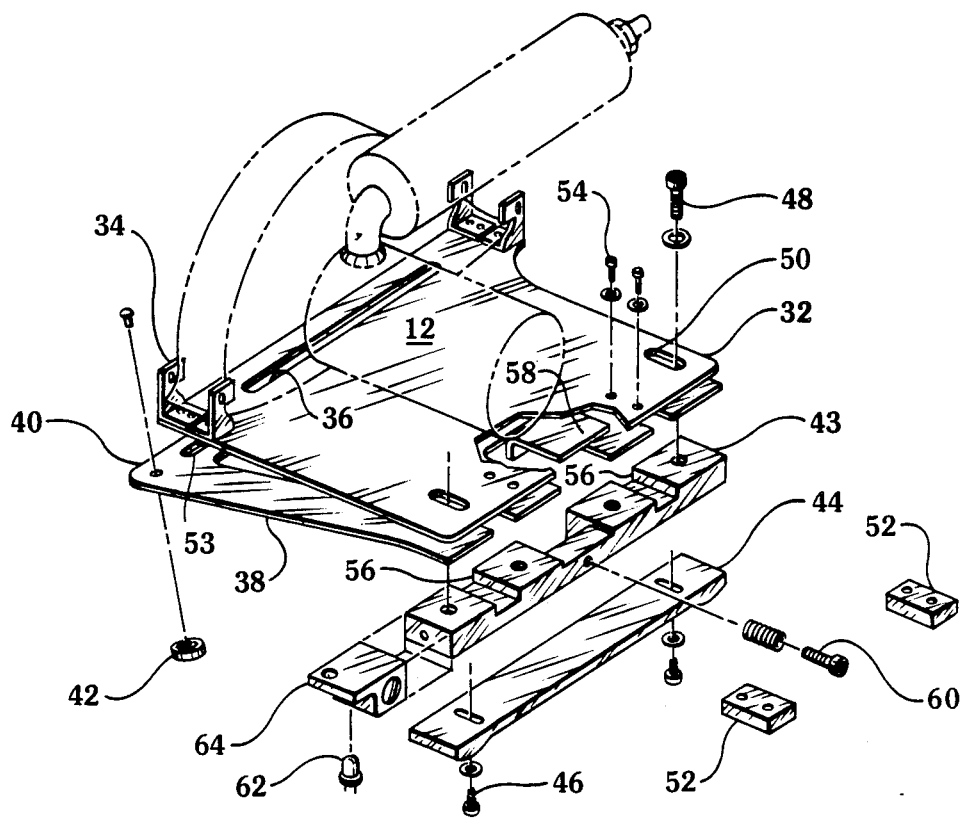
FIG. 4 is an exploded view of the metal skin trimming device which particularly illustrates the adjustable feature for the guide means.
Figure 5:
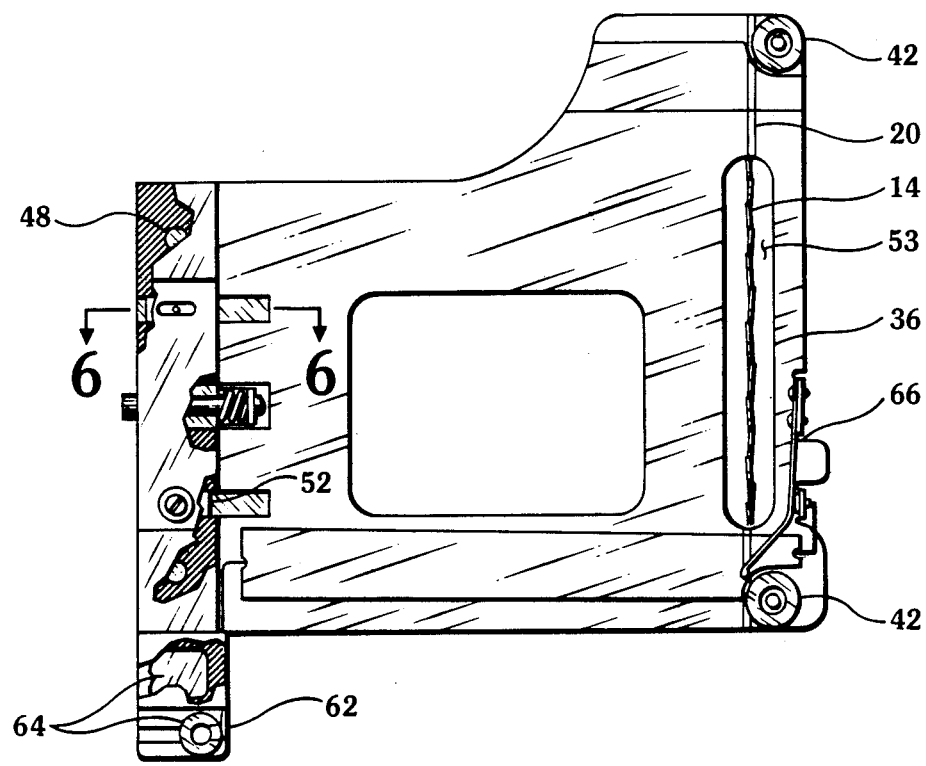
FIG. 5 is a plan view of the base plate of the illustrated skin trimming device and particularly illustrating the electro-optical means for determining when the device is being correctly positioned in use.
Figure 6:
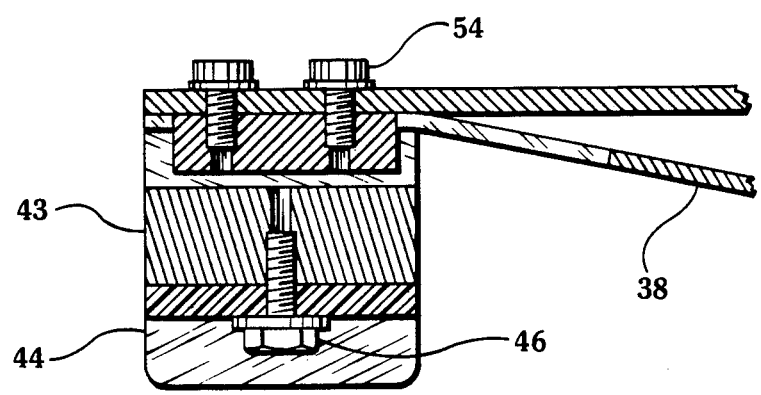
FIG. 6 is a fragmentary section taken along line 6—6 in FIG. 5.

Referring now to the drawing FIGS. and particularly to FIGS. 3-5. The saw 12 is rotatably journalled to a base plate 32 by a spring loaded connection 34 that biases the saw 12 away from cutting contact with the skin 18. The base plate 32 is provided with a slot 36 through which the blade 28 extends for cutting purposes.

The base plate 32 has adjustably secured to its lower surface at an end opposing the slot 36 a flexible lower plate 38 which extends downwardly from the base plate 32 with a free end 40 adjacent to the blade 28. The lower plate 38 has secured at its outer margin 40 a guide which is illustrated as comprising a pair of spaced roller bearings 42, and a suitable slot 53 that overlaps slot 36 when the device 10 is used. The lower plate 38 and the base plate 32 have suitably secured at the end opposing the saw 12 an extension block 43 that is provided with an elastomeric member 44, such as Teflon ®, to permit the tool 12 to be easily slid along the surface of the skin 18. The member 44 is secured to the extension member 43 as by bolts 46.

The extension member 43 and the lower plate 38 with attached guide roller bearing 42 are adjustable secured to the base plate 32 by bolts 48 which extend downwardly through slots 50 in the base plate 32.

A guide means is provided to accurately position the guide roller bearing 42 relative to the blade 28 when adjusting the device 10 to vary the gap between skins 14 and 18. The guide means takes the form of spaced guide blocks 52 that are secured to base plate 32 by suitable bolts 54. The guide roller bearing 42 cooperate with guide slots 56 formed in extension member 43 to accurately position the lower plate 38 and roller bearing guide 42 in longitudinal and transverse directions. The base plate 32 has attached at its bottom surface an angle bracket 58 which threadedly engages a spring loaded bolt 60 which extends through extension member 43. Rotation of the bolt 60 in a predetermined direction drives the extension member 43 in a predetermined direction to permit the distance the guide roller bearing 42 is spaced from the blade 28.

An electro-optical means may be provided to ensure the guide roller bearing 42 is properly contacting the true edge of the skin 14. This electro-optical means may take the form of a light emitting diode (LED) 62 which is powered by a suitable battery (not shown) container in a battery holder 64 secured to extension 43. The LED is connected by suitable electrical connections (not shown) to a switch 66 that is closed to turn the LED 62 on when both of the guide roller bearings 42 are in contact with the true edge of skin 14.

OPERATION

When it is desired to cut the overlapping margin of skin 18 with device 10, the gap between the skins 14 and 18 is set by adjusting biased bolt 60 to a predetermined position. The device 10 is then positioned between skins 14 and 18 as seen in FIGS. 1 and 2 with both of the guide roller bearing 42 in contact with the true edge of skin 14. The saw 12 is then turned on and rotated downwardly so that the blade 28 cuts through the skin 18. The device 10 is then drawn along the edge of the skin 14 while the guide means 42 maintains contact with the edge of skin 14. As the device is caused to traverse along the edge of skin 14 as an operator maintains the guide 42 in contact therewith the edge 20 of skin 18 is cut to a net shape that complements the shape of the edge of skin 14 and a predetermined gap is maintained therebetween.

It will be appreciated that the device may cut contoured surfaces such as are commonly encountered in aircraft construction. While a presently preferred embodiment of the invention has been described for purposes of this particular disclosure, numerous changes may be made which will rapidly suggest themselves to those skilled in the art and which are encompassed within the spirit of the invention disclosed and defined in the appended claims.

What is claimed is:

1. A device for trimming an end of a first metal skin to a shape that is complementary to an end of a second metal skin, comprising:
    a base plate provided with a slot and adapted to be suitably positioned on the upper surface of a first metal skin;
    a power driven metal saw means rotatably secured to and biased away from the base plate; said power driven saw means having a rotatable annular saw blade and adapted to rotatably extend said rotatable driven annular saw blade through said slot in the base plate against said bias;
    a lower flexible plate secured to the bottom of the base plate at an open end opposing the slot in the base plate at an angle, the lower plate being provided with a slot complementary in size to the slot in the base plate and arranged so that the rotatable saw blade may also extend through the lower plate; and
    guide means secured to the lower plate adjacent to the slot and arranged to contact the end of the second skin whereby the driven annular saw blade may be rotatably extended downwardly through the slots in the base and lower plate into cutting contact with the first skin and cut the first skin to a shape that is complementary to the end of the second skin as the guide means is maintained in contact with the end of the second skin,
    whereby the flexibility of said lower plate allows said lower plate to yield sufficiently to permit the base plate to be brought into sliding engagement with the first skin.

2. The device of claim 1 wherein the rotatable guide means comprises a pair of spaced roller bearings that are journalled to the lower plate and which are adapted to maintain the saw blade in parallel alignment with the end of the second skin as the device is caused to traverse said end.

3. The device of claim 1 wherein the lower plate is provided with a downwardly extending extension that has an outer surface that is particularly adapted to maintain sliding contact with the second skin.

4. The device of claim 3 wherein said extension includes an elastomeric member that provides the sliding contact with the second skin.

5. The device of claim 1 wherein the power driven saw means is journalled to the base plate so that said saw means may be rotated downwardly to extend the rotating saw blade through the slots in the base and lower plate into cutting contact with first skin.

6. The device of claim 1 wherein the lower plate is adjustable secured to the base plate whereby the gap between the end of the second skin and end of the first skin may be set to a predetermined amount.

7. The device of claim 6 wherein complementary contacting guide surfaces are provided in the base and lower plates to ensure that the rotating saw blade is maintained in parallel alignment with the guide surfaces to thereby ensure that the ends of the first and second skins are aligned.

8. The device of claim 7 wherein adjustable screw means threadably engages the base plate and a downwardly extending extension secured to the lower plate so as to permit relative sliding engagement of said complementary guide surfaces.

9. The device of claim 8 further comprising a selective locking means to fixedly secure the lower plate after the lower plate and upper plate have been relatively adjusted with respect to each other.

10. The device of claim 1 wherein an optical indicating means indicate when the guide means is being maintained in guiding contact with the end of the second skin.

* * * * *